(12) United States Patent
de Perthuis et al.

(10) Patent No.: US 10,846,961 B2
(45) Date of Patent: Nov. 24, 2020

(54) RF COMMUNICATION FOR SECURE ACCESS

(71) Applicant: NXP B.V., Eindhoven (NL)

(72) Inventors: Hugues Jean Marie de Perthuis, Garcelles (FR); Frank Leong, Veldhoven (NL); Diwakar Subraveti, Bangalore (IN); Sören Heisrath, Kaltenkirchen (DE); Srivathsa Masthi Parthasrathi, Bangalore (IN)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/737,167

(22) Filed: Jan. 8, 2020

(65) Prior Publication Data
US 2020/0226865 A1 Jul. 16, 2020

(30) Foreign Application Priority Data

Jan. 10, 2019 (EP) .................................... 19290002

(51) Int. Cl.
*G07C 9/20* (2020.01)
*G01S 13/76* (2006.01)
*G07C 9/00* (2020.01)
*H04B 1/7103* (2011.01)

(52) U.S. Cl.
CPC .............. *G07C 9/20* (2020.01); *G01S 13/76* (2013.01); *G07C 9/00309* (2013.01); *G07C 9/00896* (2013.01); *H04B 1/7103* (2013.01); *G07C 2009/00555* (2013.01); *G07C 2009/00793* (2013.01)

(58) Field of Classification Search
None
See application file for complete search history.

(56) References Cited

U.S. PATENT DOCUMENTS

| 8,891,451 | B2* | 11/2014 | Shao ...................... H04W 72/02 |
| | | | 370/328 |
| 9,485,609 | B2 | 11/2016 | Hekstra et al. |
| 9,894,662 | B2* | 2/2018 | Jagger .................. H04B 1/7103 |
| 2008/0043813 | A1* | 2/2008 | Azenkot ............ H04B 1/71632 |
| | | | 375/133 |

(Continued)

FOREIGN PATENT DOCUMENTS

| EP | 1906580 A2 | 4/2008 |
| EP | 3370365 A1 | 9/2018 |

OTHER PUBLICATIONS 802.15.4-2015 IEEE Standard for Low-Rate Wireless Networks; Clause 16 HRP UWB PHY (pp. 446-474); Apr. 22, 2016; DOI: 10.1109/IEEESTD.2016.7460875.

(Continued)

*Primary Examiner* — Carlos Garcia

(57) ABSTRACT

An Ultra-Wideband (UWB) wireless communication device includes a scanning circuit, an ordering circuit, and a selecting circuit. The scanning circuit is configured for scanning at least a channel supported by the communication device for detecting a plurality of patterns of a UWB frame format. The ordering circuit is configured for ordering the plurality of patterns in a patterns list according to a predefined quality parameter. The selecting circuit is configured for selecting at least one of the patterns in the list to start an Ultra Wideband (UWB) wireless communications.

15 Claims, 4 Drawing Sheets

(56) References Cited

U.S. PATENT DOCUMENTS

2015/0071462 A1* 3/2015 Konchitsky .......... H04R 1/1083
381/94.2

OTHER PUBLICATIONS

Leong, Frank; "EIRP Considerations;" IEEE Draft; Doc.:<15-18-0457-00-004Z>; Project: IEEE P802.15 Working Group for Wireless Personal Area Networks (WPANs); Submitted Sep. 12, 2018.

* cited by examiner

RF COMMUNICATION FOR SECURE ACCESS

CROSS-REFERENCE TO RELATED APPLICATIONS

This application claims priority under 35 U.S.C. § 119 to European Patent Application No. 19290002.5, filed on Jan. 10, 2019, the contents of which are incorporated by reference herein.

FIELD

The present disclosure relates to a RF (radio frequency) communication system such as those applied for providing a secure access to a vehicle. The disclosure describes how the interferences impacting the quality of the transmission can be reduced by scanning the usable RF space to detect the optimal parameters and how these parameters can be exchanged between the two sides of the communication.

BACKGROUND

For keyless entry systems, RF ranging sub-systems are used. Today keyless entry systems rely on Received Signal Strength Indicator (RSSI) to estimate range of a key fob from the car. An attacker can perform a so called relay attack, by using amplifiers to relay a key fob signal, so it appears close to the car.

Some RF ranging systems employ the Time-of-Flight principle to determine the distance between two objects or markers on objects. Usually, a transceiver's initiator sends out a waveform (commonly a chirp or a pulse), which is either reflected by an object or retransmitted by a second transceiver (responder). Based on the amount of time it takes for the reflection or retransmission to reach the originating transceiver's initiator, the distance between the objects can be calculated.

The range between the responder and the initiator will be used as a control point to enable access to the vehicle (for example, access to the vehicle may be enabled only within a predefined distance from the vehicle itself).

Ultra-Wideband (UWB) based ranging may be in particular used. The current standard frame format for UWB based ranging is defined in the standard IEEE 802.15.4-2015 HRP PHY and can be seen in FIG. 5.

Each frame 100 consists of a preamble 101 for synchronization, a physical layer header (PHR) 102 and a payload 103 for the transmitted data. The preamble 101 is further divided into synchronization symbols (SYNC) and a Start-of-Frame Delimiter (SFD). The preamble symbols have special properties to allow easy synchronization and an estimation of the Channel Impulse Response (CIR). This is achieved by several repetitions of the same spreading sequence.

This frame is transmitted over a channel, i.e. a band of 500 MHz, selected over a list of 14 channels, selected for transmission of UWB The standard-compliant SYNC as defined in standard IEEE 802.15.4-2015 HRP PHY is composed of a certain number of preamble symbols (for example 16, 64, 1024, or 4096 symbols), which are transmitted consecutively. A single preamble symbol is constructed using a certain ternary spreading sequence, taken from a set of available sequences from a ternary alphabet (−1, 0, 1), as mentioned in the standard. During the transmission of the SYNC, the preamble symbol does not change. This allows the responder to retrieve timing information and to obtain a channel estimate.

The system's performance will be limited by how much the RF signals are degraded as they travel from an initiator to a responder. Two common degradation mechanisms are attenuation and reflection due to the radio channel, but other mechanisms include interference from other (radio) systems.

Indeed, the SYNC signal can be only selected from a limited number (even if the number is increased via Pulse Frequency Control such as described in U.S. Pat. No. 9,485,609). This means that in an environment where there are a large number of initiators, e.g., a car park, there is a risk that multiple initiators use same sync patterns and interfere between them.

Also if the same synchronization pattern is used by multiple devices, each of these devices will need to perform additional steps to filter messages, increasing current consumption. For an RF responder to synchronize to the initiator it has among other tasks to detect the position of a known marker in the received signal, i.e. the SYNC signal.

It is therefore desirable to define an improved RF ranging system for secure access by optimizing allocations of SYNC patterns (or other patterns, such as SFD) over the different 500 MHz bands (channels) to maximize multi-user channel capacity.

OBJECT AND SUMMARY

It may be an object of the present disclosure to provide an Ultra-Wideband wireless communication device, system and method for providing a secure access to a vehicle through an efficient and secure ranging technique.

In order to achieve the object defined above, Ultra-Wideband (UWB) wireless communication device, system and method according to the independent claims are provided. The dependent claims describe various embodiments.

According to a first aspect, an Ultra-Wideband (UWB) wireless communication device is provided, the communication device including:

a scanning circuit configured for scanning at least a channel supported by the communication device for detecting a plurality of patterns of a UWB frame format, an ordering circuit configured for ordering the plurality of patterns in a patterns list according to a predefined quality parameter, a selecting circuit configured for selecting at least one of the patterns in the list to start a Ultra-Wideband (UWB) wireless communication.

The plurality of patterns may be one of a plurality of SYNC pattern or of a plurality of SFD patterns.

According to a second aspect of the present disclosure, an Ultra-Wideband (UWB) wireless communication system including an initiator device and a responder device is provided, wherein at least one of the initiator device and the responder device is the communication device above defined.

According to one or more embodiments, one of the initiator device and the responder device may be a key fob or a smartphone and the other of the initiator device and the responder device may be installed on a vehicle.

According to a third aspect of the present disclosure, an Ultra-Wideband (UWB) wireless communication method between an initiator device and a responder device is provided, wherein the method includes the step of:

scanning at least a channel supported by the communication device for detecting a plurality of patterns of a UWB frame format, ordering the plurality of patterns in a patterns list according to a predefined quality parameter, selecting at least one of the patterns in the list to start a Ultra-Wideband (UWB) wireless communication Thus, the pattern of a standard UWB frame (for example SYNC or SFD pattern) to be used for the ranging session may not be static or randomly chosen by initiator among those available, but may be selected by scanning available SYNC (or SFD) patterns for ongoing UWB transmissions, ordering the patterns in a list and then determining which SYNC (or SFD) pattern is the best to used. The "best pattern" may be chosen according to a predefined quality parameter, for example as the least susceptible to interference or the least used in the reference RF space. This concept may be applicable to any system where multiple independent responders/initiators share the same RF space and where a separate communication link, also call Out of Band channel, can be used to setup the RF session between an initiator and a responder.

According to embodiments where one single communication session is established between initiator and a responder, the pattern on top of the list is chosen.

An Out Of Band (OOB) signal may be used to ensure that it is allocated to and aligned between intended UWB initiator-responder pairs (or transceiver pairs, in case of symmetric allocation).

According to one or more embodiments, the initiator may start a communication with the chosen pattern and, if after a timeout time no answer has been received from the responder device, the pattern selection is changed to the next pattern in the list.

Depending on the application requirement and on the capabilities of the initiator and the responder, the scanning may be performed either by the responder or initiator, by using the respective scanning circuit, or by both. It might also be performed in advance or when a short session is being started and might be periodically updated during the session.

Depending on the application requirement and on the capabilities of the initiator and the responder, also the steps of ordering and selecting may be performed either by the responder or initiator, by using the respective scanning circuit, or by both Between UWB initiator and responder, a session may be established to exchange keys and agree on some RF parameters. This session establishment might occur on a OOB communication link, such a BLE or Wifi.

According to embodiments, a communication session is established long before a ranging phase, e.g. continuously or regularly once a day or a week. In those embodiments the initiator, e.g. a key fob, may receive a beaconing signal from the responder and starts the ranging phase.

According to other embodiments, a communication session may be established or refreshed just before the ranging phase. In those embodiments the initiator detects a beaconing signal, connects to the responder and establishes a session, e.g. with key exchange and RF parameters.

In some alternative embodiments, the initiator may be the node transmitting the beacon signal via a co-located Out-Of-Band (OOB) radio transceiver.

In some alternative embodiments, the patterns list is optimized after comparison with existing lists from other responders nearby.

In some alternative embodiments, after receiving the beaconing signal, the steps of scanning and ordering the plurality of patterns is performed also in the initiator to generate a second patterns list, the method comprising a further step of modifying the patterns list by removing patterns which are not included in the second patterns list.

Thus, through the above described optimization techniques, the quality parameter of the SYNC (or SFD) pattern to be used best may be improved.

The aspects defined above and further aspects of the present disclosure are apparent from the examples of embodiment to be described hereinafter and are explained with reference to the examples of embodiment. The disclosure will be described in more detail hereinafter with reference to examples of embodiment but to which the disclosure is not limited.

DESCRIPTION OF EMBODIMENTS

Figure 1:
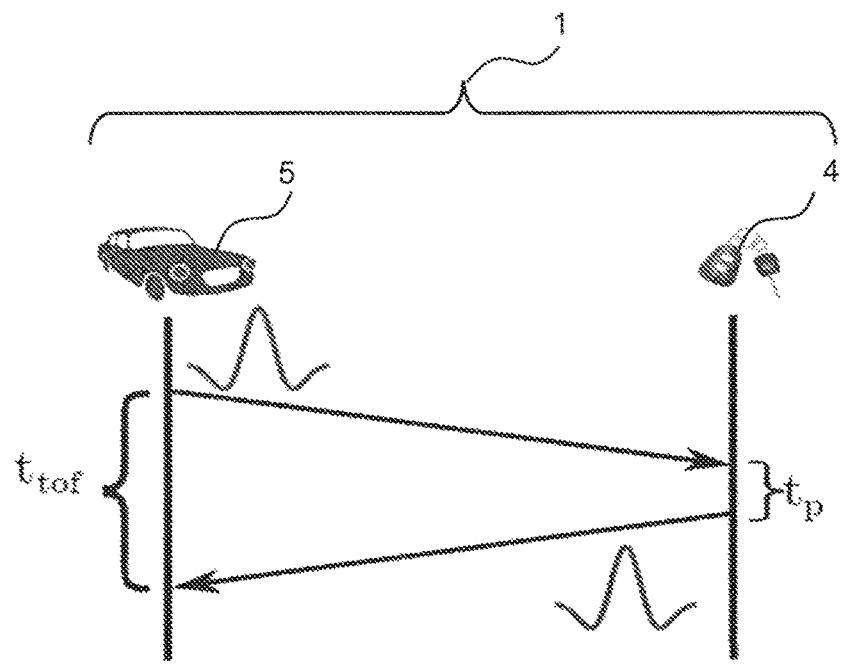
FIG. 1 shows a schematic view of an UWB communication system according to embodiments of the present disclosure.

FIG. 1 shows an Ultra-Wideband (UWB) wireless communication system 1 including an initiator 4 device and a responder 5 device.

The initiator device may be integrated in a key fob.

According to other embodiments, the initiator device is integrated in a smartphone or other similar portable device.

The responder 5 may be comprised in a vehicle.

According to other embodiments, the responder device is integrated in a space or room to be accessed through a key fob or through a smartphone or other similar portable device.

Between initiator and responder a ranging session based on a time-of-flight determination is performed. In a round-trip based time-of-flight ranging a round-trip distance between an initiator and a responder can be calculated as the result of the formula:

$$(t_{tof} - t_{proc}) * c/2,$$

Where $t_{tof}$ is the total time of flight between initiator and responder, $t_{proc}$ is the time of processing and c is the speed of light.

Multi sided ranging, i.e. where one side transfers its own measurements to the other side, can be used. Also, one side might feature multiple UWB nodes to allow better positioning by ensuring that one or several nodes will always have a direct line of sight to the key fob or smartphone or other similar portable device.

Figure 2:
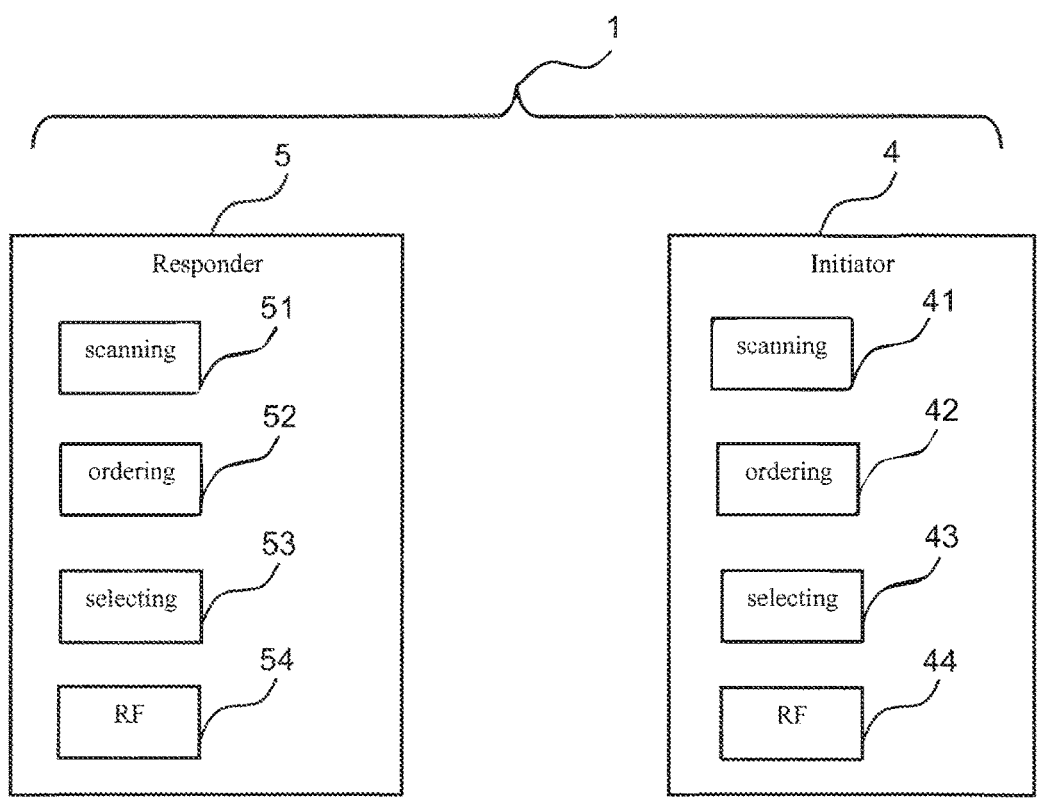
FIG. 2 shows a block diagram of an UWB communication system according to embodiments of the present disclosure

With reference to the diagram block of FIG. 2, each of the initiator 4 and the responder 5 includes:

a respective scanning circuit 41, 51 configured for scanning at least a channel supported by the initiator 4 or the responder 5, respectively, for detecting a plurality of patterns of a UWB frame format, a respective ordering circuit 42, 52 configured for ordering the plurality of patterns in a patterns list according to a predefined quality parameter, a respective selecting circuit 43, 53 configured for selecting at least one of the patterns in the list to start a Ultra-Wideband (UWB) wireless communication. According to other embodiments, any of the scanning circuit 41, 51, the ordering circuit 42, 52 and the selecting circuit 43, 53 are provided only in the initiator 4 or in the responder 5.

Each of the initiator 4 and the responder 5 includes a respective RF transceiver 44, 54, which may be used to perform a Ultra-Wideband (UWB) communication with each other.

Figure 3:
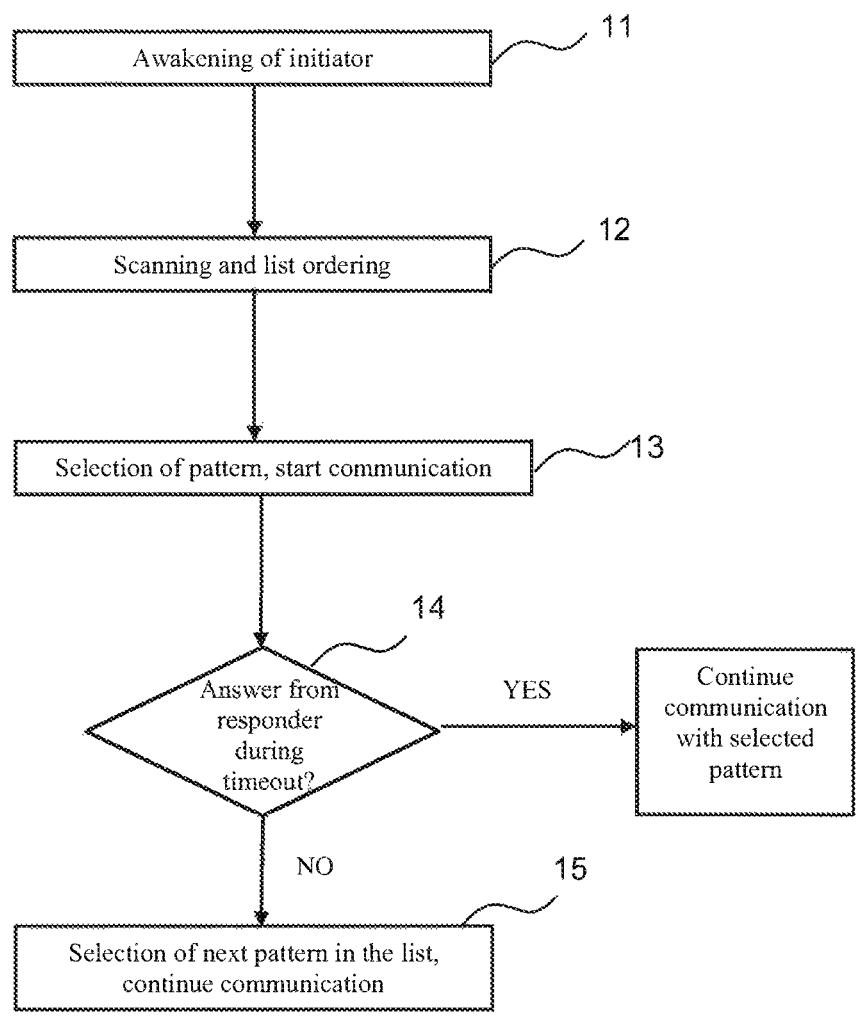
FIG. 3 shows a block diagram of a first embodiment of an UWB communication method according to embodiments of the present disclosure.

The communication between an initiator 4 device and a responder 5 device may be performed according to the method below described and represented in FIG. 3.

In this embodiment of the communication method the initiator 4 device is a key fob and the responder 5 is comprised in a car.

In a first step 11 of the communication method, the key fob 4 is awakened by a beaconing signal received by the responder 5 and initiates a communication session with the responder 5. An Out Of Band (OOB) signal is used to ensure that the communication session is allocated to and aligned between initiator 4 and responder 5.

According to other embodiments, the beaconing signal, for example a Bluetooth Low Energy (BLE) signal or a LF/UHF signal, besides awakening the initiator, is also used to transmit a limited amount of additional information.

In a second step 12 of the communication method, the responder 5 scans the channels of the RF space supported by the responders 5 for detecting a plurality of available SYNC patterns. Alternatively, or in addition to the SYNC patterns, the scanning step 12 is performed for scanning the channels of the RF space for detecting a plurality of available SFD patterns. The scanning order can be optimized to cover most popular channels and SYNC patterns. The second step 12 may be performed using the scanning circuit 51 of the responder 5.

The length of the scanning is chosen long enough to ensure that it covers a complete period of the most common ranging rate(s).

After the scanning has been completed a list of SYNC patterns is compiled, according to an order based on a predetermined quality assessment of the patterns. The plurality of patterns are ordered from the least susceptible to interferences to the most susceptible to interferences, i.e. from the least used to the most used. The list of SYNC patterns may be compiled using the ordering circuit 42 of the initiator 4 or the ordering circuit 52 of the responder 5.

In other embodiments, other predetermined quality parameters may be used for ordering the SYNC patterns.

In a third step 13 of the communication method, at least one of the patterns in the list is selected to be used in a Ultra-Wideband (UWB) communication between initiator 4 and responder 5. During negotiation of the pattern to be used, the responder 5 uses the patterns list to agree with the key fob 4 on a pattern to be used. The third step 13 may be performed using the selecting circuit 43 of the initiator 4 or the selecting circuit 53 of the responder 5.

According to embodiments where one single communication session is established between initiator and a responder, the pattern on top of the list is chosen.

Other patterns to be used can be randomly selected from the list to prevent that if multiple sessions are started in parallel they all select the same one. In one or more embodiments more than one pattern is agreed upon in the communication between initiator 4 and responder 5.

According to embodiments, the selection may be based on a restricted subset of patterns supported by the initiator, e.g. key fob.

After one or more patterns have been agreed upon in the communication between initiator 4 and responder 5, the initiator 4 starts UWB transmission with the agreed pattern (s)

In a fourth step 14 of the communication method, the initiator 4 waits to receive an answer from the responder 5 up to when a timeout time is expired. If after the timeout time, no answer is received from the responder 5, then the communication method continues with a fifth step 15, in which the initiator 4 switches to a next pattern of the list for continuing the communication. The responder 5 switches also to the next pattern of the list. Alternatively, the responder may employ multiple parallel listening sessions, with one session for each pattern. The fourth step 14 and the fifth step 15 may be repeated up to when a communication is established, i.e. up to when the initiator 4 receives an answer from the responder 5.

During the communication between initiator 4 and responder 5 multiple ranging cycles based on a time-of-flight determination are performed with an improved level of reliability thanks to the above described selection of the SYNC (and/or SFD) pattern(s) to be used. Consequently also access to the car is performed with an improved level of security.

Figure 4:
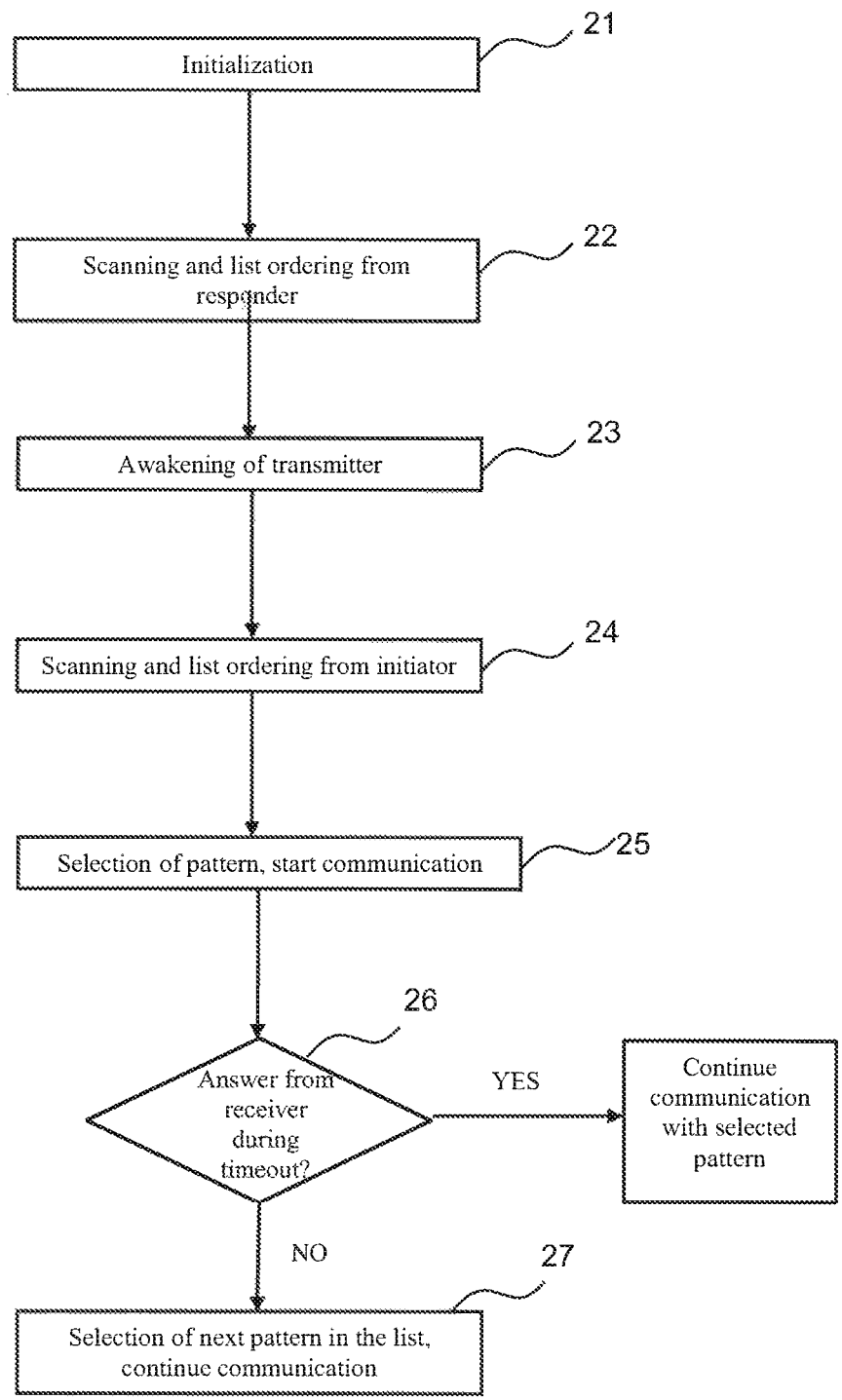
FIG. 4 shows a block diagram of a second embodiment of an UWB communication method according to embodiments of the present disclosure.
Figure 5:
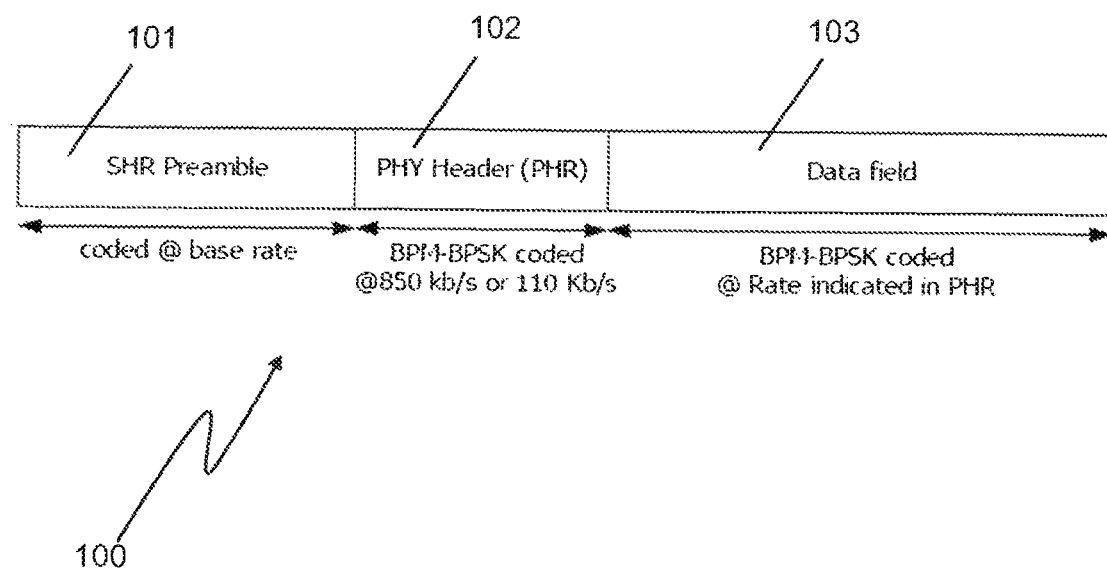
FIG. 5 shows a standard frame format for UWB based ranging.

The communication between an initiator 4 device and a responder 5 device may be performed according to another embodiment of the method below described and represented in FIG. 4.

In this embodiment of the communication method the initiator 4 device is a smartphone and the initiator 5 is comprised in a car.

In a first step 21 of the communication method, a communication session is initiated between car and mobile phone with key exchange, possibly up to a few hours before the ranging session is performed for secure access to the car.

In a second step 22 of the communication method, the responder 5 scans the channels of the RF space supported by the responders 5 for a plurality of available SYNC patterns. Alternatively or in addition to the SYNC patterns, the scanning step 12 is performed for scanning the channels of the RF space for a plurality of available SFD patterns. The scanning order can be optimized to cover most popular channels and SYNC patterns. The second step 22 may be performed using the scanning circuit 51 of the responder 5.

The length of the scanning is chosen long enough to ensure that it covers a complete period of the most common ranging rate(s).

After the scanning has been completed a list of SYNC patterns is compiled, according to an order based on a predetermined quality assessment of the patterns. The list of SYNC patterns may be compiled using the ordering circuit 42 of the initiator 4 or the ordering circuit 52 of the responder 5. The plurality of patterns are ordered from the least susceptible to interferences to the most susceptible to interferences, i.e. from the least used to the most used.

In other embodiments, other predetermined quality parameters may be used for ordering the SYNC patterns.

Multiple anchors may be used for scanning; in this case, the responder 5 keeps the intersection of the lists from each of the anchors.

According to embodiments, the responder 5 acquires the lists of the responders of other nearby cars to optimize its own list.

In a third step 23 of the communication method, the initiator 4 is awakened by a beaconing signal received by the responder 5, or via other ways such a geofencing or motion sensors. The generated list of SYNC (and/or SFD) patterns is broadcasted over an Out Of Band (OOB) signal ensure that it is allocated to and aligned between initiator 4 and responder 5. This OOB information can be transmitted together with the beaconing signal or over a different medium.

In a fourth step 24 of the communication method, the initiator 4 scans its surrounding for the different channels it supports for detecting a plurality of available SYNC (and/or SFD) patterns. The fourth step 24 may be performed using the scanning circuit 41 of the initiator 4. These operations are performed only if battery level of the initiator 4 (smartphone) is high enough. The initiator 4 compiles a second list of SYNC (and/or SFD), using the ordering circuit 42 patterns and a final list obtained by modifying the patterns list received by the responder 5 by removing patterns which are not included in the second patterns list. The final list of SYNC (and/or SFD) patterns results as an intersection of the two lists respectively compiled by the initiator 4 and the responder 5. The second list of the initiator 4 is compiled as the responder (car) 5 is at a different position, i.e. it might have a different view of the RF space.

Information from additional nodes, i.e. other initiators and/or responders, may be used to re-arrange the patterns in the final list.

In a fifth step 25 of the communication method, at least one of the patterns in the final list is selected to be used in an Ultra-Wideband (UWB) communication between initiator 4 and responder 5. During negotiation of the pattern to be used, the responder 5 uses the patterns list to agree with the initiator 4 on a pattern to be used. The fifth step 25 may be performed using the selecting circuit 43 of the initiator 4 or the selecting circuit 53 of the responder 5.

According to embodiments where one single communication session is established between initiator and a responder, the pattern on top of the list is chosen.

Other patterns to be used can be randomly selected from the list to prevent that if multiple sessions are started in parallel they all select the same one. More than one pattern can be agreed upon in the communication between initiator 4 and responder 5.

According to embodiments, the selection may be based on a restricted subset of patterns supported by the smartphone.

After one or more patterns have been agreed upon in the communication between initiator 4 and responder 5, the initiator 4 starts the UWB transmission with the agreed pattern(s).

In a sixth step 26 of the communication method, the initiator 4 waits to receive an answer from the responder 5 up to when a timeout time is expired. If after the timeout time, no answer is received from the responder 5, then the communication method continues with a seventh step 27, in which the initiator 4 switches to a next pattern of the list for continuing the communication. The responder 5 switches also to the next pattern of the list. Alternatively, the responder may employ multiple parallel listening sessions, with one session for each pattern. The sixth step 26 and the seventh step 27 may be repeated up to when a communication is established, i.e. up to when the initiator 4 receives an answer from the responder 5.

Analogously to the first embodiment above described, during the communication between initiator 4 and responder 5 a ranging session based on a time-of-flight determination is performed with an improved level of reliability thanks to the above described selection of the SYNC (and/or SFD) pattern to be used. Consequently also access to the car is performed with an improved level of security.

In this specification, example embodiments have been presented in terms of a selected set of details. However, a person of ordinary skill in the art would understand that many other example embodiments may be practiced which include a different selected set of these details. It is intended that the following claims cover all possible example embodiments.

REFERENCE NUMERALS

1: communication system,
4: initiator (key fob, smartphone)
5: responder (car)
11, 12, 13, 14, 15 steps of first embodiment of communication method
21, 22, 23, 24, 25, 26, 27 steps of second embodiment of communication method
41, 51: scanning circuit
42, 52: ordering circuit
43, 53: selecting circuit
100 standard UWB frame 100
101 preamble for synchronization,
102 physical layer header (PHR)
103 payload for the transmitted data

The invention claimed is:

1. An Ultra-Wideband (UWB) wireless communication device, the communicating device including:
   a scanning circuit configured for scanning at least a channel supported by the communication device for detecting a plurality of patterns of a UWB frame format,
   an ordering circuit configured for ordering the plurality of patterns in a patterns list according to a predefined quality parameter,
   a selecting circuit configured for selecting at least one of the patterns in the list to start a Ultra-Wideband (UWB) wireless communication.

2. The Ultra-Wideband (UWB) wireless communication device according to claim 1, wherein the plurality of patterns are at least one of a plurality of SYNC pattern or of a plurality of SFD patterns.

3. The Ultra-Wideband (UWB) wireless communication device according to claim 1, wherein the ordering circuit is configured for ordering the plurality of patterns from the least susceptible to interferences to the most susceptible to interferences.

4. An Ultra-Wideband (UWB) wireless communication system including an initiator device and a responder device, wherein at least one of the initiator device and the responder device is a wireless communication device according to claim 1.

5. The Ultra-Wideband (UWB) wireless communication system according to claim 4, wherein one of the initiator device and the responder device is a key fob or a smartphone and the other of the initiator device and the responder device is installed on a vehicle.

6. The Ultra-Wideband (UWB) wireless communication system according to claim 4, wherein the wireless communication includes a ranging session for calculating a distance between the initiator device and the responder device.

7. The Ultra-Wideband (UWB) wireless communication system according to claim 4, wherein the initiator device is configured for performing a UWB wireless communication with the responder device using a pattern of the list.

8. The Ultra-Wideband (UWB) wireless communication system according to claim 7, wherein, if after a timeout time no answer has been received from the responder device, the initiator device switches to the next pattern of the list.

9. An Ultra-Wideband (UWB) wireless communication method between an initiator device and a responder device, wherein the method includes the step of:
scanning at least a channel supported by the communication device for detecting a plurality of patterns of a UWB frame format,
ordering the plurality of patterns in a patterns list according to a predefined quality parameter,
selecting at least one of the patterns in the list to start a Ultra-Wideband (UWB) wireless communication.

10. The Ultra-Wideband (UWB) wireless communication method of claim 9, wherein in the step of selecting, the pattern on top of the list is chosen.

11. The Ultra-Wideband (UWB) wireless communication method of claim 9, wherein after the step of selecting one of the patterns in the list to start a Ultra-Wideband (UWB) wireless communication, if after a timeout time no answer has been received from the responder device, the selection is changed to the next pattern in the list.

12. The Ultra-Wideband (UWB) wireless communication method of claim 9, wherein before the steps of scanning and ordering are performed by the responder, the initiator device initiates a communication session with the the responder device upon receipt of a beaconing signal.

13. The Ultra-Wideband (UWB) wireless communication method of claim 12, wherein after receiving the beaconing signal, the steps of scanning and ordering the plurality of patterns is performed also in the initiator device to generate a second patterns list, the method comprising a further step of modifying the patterns list by removing patterns which are not included in the second patterns list.

14. The Ultra-Wideband (UWB) wireless communication method of claim 9, wherein the steps of scanning and ordering are performed continuously by the responder.

15. The Ultra-Wideband (UWB) wireless communication method of claim 14, wherein the patterns list is optimized after comparison with existing lists from other responders nearby.

* * * * *